United States Patent
Papapanagiotou et al.

(10) Patent No.: US 10,749,921 B2
(45) Date of Patent: Aug. 18, 2020

(54) TECHNIQUES FOR WARMING UP A NODE IN A DISTRIBUTED DATA STORE

(71) Applicant: NETFLIX Inc., Los Gatos, CA (US)

(72) Inventors: Ioannis Papapanagiotou, San Jose, CA (US); Shailesh Birari, Campbell, CA (US); Jason Cacciatore, Los Gatos, CA (US); Minh Do, San Jose, CA (US); Christos Kalantzis, San Jose, CA (US)

(73) Assignee: NETFLIX, INC., Los Gatos, CA (US)

(*) Notice: Subject to any disclaimer, the term of this patent is extended or adjusted under 35 U.S.C. 154(b) by 234 days.

(21) Appl. No.: 15/379,299

(22) Filed: Dec. 14, 2016

(65) Prior Publication Data

US 2017/0353515 A1 Dec. 7, 2017

Related U.S. Application Data

(60) Provisional application No. 62/344,326, filed on Jun. 1, 2016.

(51) Int. Cl.
*H04L 29/08* (2006.01)
*G06F 11/14* (2006.01)
*H04L 29/06* (2006.01)
*H04L 12/861* (2013.01)
*G06F 16/25* (2019.01)

(52) U.S. Cl.
CPC .......... *H04L 65/601* (2013.01); *G06F 11/14* (2013.01); *G06F 16/256* (2019.01); *H04L 49/9094* (2013.01); *H04L 67/10* (2013.01); *H04L 67/1034* (2013.01); *H04L 67/1095* (2013.01); *H04L 67/1097* (2013.01)

(58) Field of Classification Search
CPC . H04L 67/1097; H04L 67/10; H04L 67/1034; G06F 3/06; G06F 11/14
USPC ........................................... 709/219
See application file for complete search history.

(56) References Cited

U.S. PATENT DOCUMENTS

| | | | |
|---|---|---|---|
| 5,455,944 A * | 10/1995 | Haderle | G06F 9/466 |
| 8,812,897 B1 * | 8/2014 | Helmick | G06F 11/00 |
| | | | 714/4.11 |
| 2009/0193310 A1* | 7/2009 | Hashimoto | H04L 1/1642 |
| | | | 714/749 |
| 2009/0222509 A1* | 9/2009 | King | G06F 17/30194 |
| | | | 709/203 |

(Continued)

*Primary Examiner* — Sm A Rahman
*Assistant Examiner* — Chen-Liang Huang
(74) *Attorney, Agent, or Firm* — Artegis Law Group, LLP

(57) ABSTRACT

In various embodiments, a node manager configures a "new" node as a replacement for an "unavailable" node that was previously included in a distributed data store. First, the node manager identifies a source node that stores client data that was also stored in the unavailable node. Subsequently, the node manager configures the new node to operate as a slave of the source node and streams the client data from the source node to the new node. Finally, the node manager configures the new node to operate as one of multiple masters nodes in the distributed data store. Advantageously, by configuring the node to implement a hybrid of a master-slave replication scheme and a master-master replication scheme, the node manager enables the distributed data store to process client requests without interruption while automatically restoring the previous level of redundancy provided by the distributed data store.

19 Claims, 4 Drawing Sheets

(56) References Cited

U.S. PATENT DOCUMENTS

2009/0271412 A1* 10/2009 Lacapra ............ G06F 17/30206
2018/0268030 A1*  9/2018 Liu ................... G06F 17/30463

* cited by examiner

TECHNIQUES FOR WARMING UP A NODE IN A DISTRIBUTED DATA STORE

CROSS-REFERENCE TO RELATED APPLICATIONS

This application claims the priority benefit of the U.S. Provisional Patent Application having Ser. No. 62/344,326 and filed on Jun. 1, 2016. The subject matter of this related application is hereby incorporated herein by reference.

BACKGROUND OF THE INVENTION

Field of the Invention

Embodiments of the present invention relate generally to computer science and, more specifically, to techniques for warming up a node in a distributed data store.

Description of the Related Art

A distributed data store typically stores data for clients in nodes that are distributed across multiple geographic regions. The nodes are typically interconnected computers or virtual machines, where each node manages a given data store and supplies storage services via a client-server architecture. In operation, the distributed data store typically receives write requests and implements a replication scheme to redundantly store the client data associated with those write requests within the various data stores managed by the different nodes within the distributed data store. Two common types of replication schemes implemented with distributed data stores are master-slave replication and master-master replication.

In master-slave replication, a designated master node receives and routes each write request to multiple slave nodes that are associated with a token range corresponding to the client data. The slave nodes then store the client data within the data stores managed by the slave nodes. If the master node becomes unavailable (e.g., experiences a power outage, etc.), then the distributed data store implements an election process to select a new master node. The new master node configures a new node as a slave node. When configuring the new slave node, the new master node stores the client data that was previously stored in the data store managed by the unavailable node in the data store managed by the new slave node. One drawback to master-slave replication is that the distributed data store is unable to receive and process requests from clients during the election process. Accordingly, clients experience an interruption of the various services provided by the distributed data store during such election processes.

In master-master replication, all the nodes are master nodes and, therefore, any node may receive and route write requests. If a particular node becomes unavailable, then the other nodes continue to receive and route write requests while a new node is added to the distributed data store and configured to receive and route write requests. Consequently, the clients do not experience any short-term interruption of the various services provided by the distributed data store.

One drawback of master-master replication is that, when the new node begins to receive and route write requests, the data store managed by the new node does not already store the client data corresponding to the token range that was associated with the unavailable node. As a result, the number of copies of the client data corresponding to the token range that are stored within the various data stores managed by the different nodes within the distributed data store is reduced by one. For example, if the unavailable node was associated with the token range 101-200, then the number of copies of the client data corresponding to the token range 101-200 that are stored within the various data stores managed by the different nodes within the distributed data store is reduced by one.

As the foregoing illustrates, what is needed in the art are more effective techniques for restoring a distributed data store after a node within the distributed data store becomes unavailable.

SUMMARY OF THE INVENTION

One embodiment of the present invention sets forth a computer-implemented method for restoring a distributed data store after a node within the distributed data store becomes unavailable. The method includes determining that a first node included in a distributed data store has become unavailable; identifying a source node included in the distributed data store that operates as a first master node, where the source node stores client data that was previously stored by the first node; configuring a new node included in the distributed data store to operate as a slave node of the source node; streaming client data from a first data store managed by the source node to a second data store managed by the new node; and after the client data has been streamed, configuring the new node to operate as a second master node.

One advantage of the disclosed techniques is that streaming the client data to the second data store restores the total number of copies of the client data that are stored within the various data stores managed by the different nodes within the distributed data store. Further, because the source node continually receives and processes write requests from clients, the clients do not experience an interruption of the various services provided by the distributed data store.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
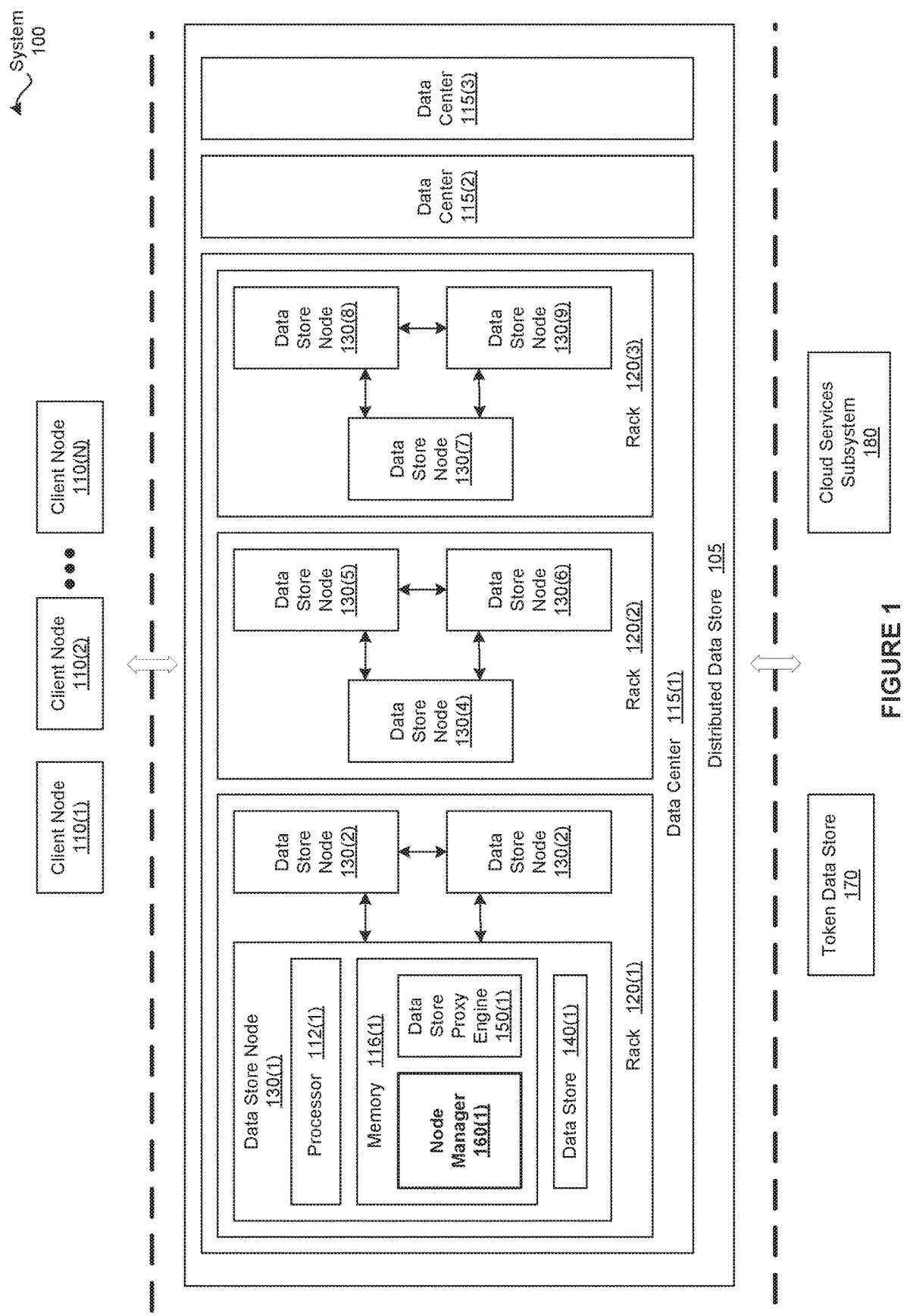
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a distributed data store 105, client nodes 110, a cloud services subsystem 180, and a token data store 170. The distributed data store 105 is also referred to herein as a "cluster" and includes, without limitation three data centers 115. Each of the data centers 115 is located in a different geographical location that is serviced by the distributed data store 105. For explanatory purposes, multiple instances of like objects are denoted with reference numbers identifying the object and parenthetical numbers identifying the instance where needed.

As shown for the data center 115(1), each of the data centers 115 includes, without limitation, nine data store nodes 130 that are organized into three racks 120 within the data center 115. Together, the data store nodes 130 that are included in all the racks 120 across all the data centers 115 are referred to as the data store nodes 130 included in the distributed data store 105.

In alternate embodiments, the distributed data store 105 may include any number of data centers 115 distributed across any number of geographical locations. Further, each of the data centers 115 may include any number of the racks 120, and each of the racks 120 may include any number of the data store nodes 130. Consequently, the distributed data store 105 may include any number of data store nodes 130. In alternate embodiments, the data store nodes 130 within the distributed data store 105 may be organized in any technically feasible fashion and across any number of geographical locations.

The data store node 130 is a virtual machine that the cloud services subsystem 180 provides and assigns to the distributed data store 105. For example, the data store node 130 could be provided by "Amazon Web Services." In alternate embodiments, the data store node 130 may be any type of processing device that manages client data via an associated storage device. For example, the data store node 130 could be a computer. As shown, the data store node 130(1) includes, without limitation, a processor 112(1) and a memory 116(1), and manages an associated data store 140 (1).

In alternate embodiments, each of the data store nodes 130 may be configured with any number (including zero) of processors 112 and memories 116, and the configuration of the data store nodes 130 may vary. In operation, the processor 112(1) is the master processor of the data store node 130(1), controlling and coordinating operations of other components included in the data store node 130(1), including the data store 140(1). The memory 116(1) stores content, such as software applications and audio-visual data, for use by the processor 112(1) of the data store node 130(1).

The data store 140 may be any type of "backend" database storage system that is capable of storing client data. For example, in some embodiments, the data store 140 may be an in-memory data store, such as a Redis data store or a Memcached data store. In other embodiments, the data store 140 may be a storage engine that is optimized for a solid-state drive. Examples of the data store 140 include a RocksDB, a Lightening Memory-Mapped Database provided by Symas, and a ForestDB provided by Couchbase, to name a few. As referred to herein, the data store node 130 manages the data store 140 that is included in the data store node 130. In various embodiments, an overlay layer and/or the node manager 160 configure the data store 140 to support master/slave replication.

As shown, the memory 116(1) associated with the data store node 130 includes, without limitation, a data store proxy engine 150, and a node manager 160. The data store proxy engine 150 provides an interface to the data store 140 and configures the non-distributed data store 140 as part of the distributed data store 105. More specifically, the data store proxy engine 150 provides peer-to-peer, linearly scalable distributed data store functionality such as high availability and master-master replication across the data centers 115 while preserving the native protocols of the data store 140. In a complementary fashion, the node manager 160 performs management operations associated with the distributed data store 105 and integrates the distributed data store 105 with the cloud services subsystem 180.

Notably, the node manager 160 configures the data store node 130 to store client data associated with a particular "token range" within the data store 140 that is managed by the data store node 130. As referred to herein, a "token" is a hash of a key portion of a key/value pair that is stored in the data store 140, and a "token range" is a range of key hashes that are associated with the client data. The token data store 170 is any type of data base that the node manager 160 configures to store mappings between each of the data store nodes 130 and the associated token range of client data. For example, the token data store 170 could be an Apache Cassandra data base.

In general, the node manager 160 divides the total possible tokens that are associated with client data by the number of data store nodes 130 included in each of the racks 120 to determine the token ranges. For instance, if there are 300 possible tokens and three data store nodes 130 included in each of the racks 120, then the node manager 160 generates three token ranges: 1-100, 101-200, and 201-300. Within each of the racks 120, the node manager 160 assigns a different token range to each of the different data store nodes 130. Consequently, a complete set of client data is stored in each of the racks 120.

As shown, because there are three racks 120 included in each of the data centers 115 and there are three data centers 115 included in the distributed data store 105, any given item of client data is stored in nine different data stores 140 in the distributed data store 105. In alternate embodiments, any entity may configure a given data store 140 to store any subset of the client data in any technically feasible fashion. Further, the distributed data store 105 may be configured to store any number of copies of the client data.

The client nodes 110 and the cluster of data store nodes 130 are configured in a client-server architecture. In operation, the distributed data store 105 receives write requests from the client nodes 110 and implements a replication scheme to redundantly store the client data associated with those write requests within the various data stores 140 managed by the different data store nodes 130 within the distributed data store 105. The client nodes 110 may include any type of client device that is capable of interacting with the data store nodes 130. Examples of client devices include, without limitation, desktop computers, laptops, smartphones, smart televisions, game consoles, tablets, television-connected devices, handheld devices streaming entertainment devices, and the like. The data store requests typically include requests to store client data and requests to read client data.

While processing write requests received from the client nodes 110, the data store nodes 130 included in the distributed data store 105 implement a master-master replication scheme. Any of the data store nodes 130 may receive and process a write request to store client data. Upon receiving a write request to store client data, the data store proxy engine 150 included in the data store node 130 determines whether the data store node 130 owns the client data. For explanatory purposes only, the data store node 130 is referred to herein as "owning" the subset of client data with tokens that lie within the token range that is associated with the data store node 130.

If the data store node 130 owns the client data, then the data store proxy engine 150 stores the client data within the data store 140 that is managed by the data store node 130. In addition, the data store proxy engine 150 asynchronously replicates the write request to other racks 120 across all the data centers 115 included in the distributed data store 105. If the data store node 130 does not own the client data, then the data store proxy engine 150 sends the write request to the data store node 130 within the same rack 120 that owns the client data. The data store proxy engine 150 also asynchronously replicates the write request to other racks 120 across all the data centers 115 included in the distributed data store 105.

Such a process stores the client data repeatedly within the distributed data store 105, thereby ensuring availability of the client data irrespective of the individual availability of each of the data stores 140, the data store nodes 130, the racks 120, and/or the data centers 115. More precisely, if a particular data store node 130 becomes unavailable (e.g., experiences a power failure, connectivity loss, etc.), then other data store nodes 130 that are available process client requests. The cloud services subsystem 180 provides a new data store node 130 to replace the unavailable data store node 130, and the node manager 160 included in the new data store node 130 configures the new data store node 130 to receive and process client requests. In alternate embodiments, the data store nodes 130 may implement any distributed data store techniques as known in the art for storing client data in a redundant fashion across the data stores 140, the data store nodes 130, the racks 120, and/or the data centers 115 and, subsequently, accessing the stored client data.

One drawback of conventional distributed data stores that implement master-master replication is that, when the new data store node 130 begins to receive and route write requests, the data store 140 managed by the new data store node 130 does not already store any client data. In particular, the data store 140 managed by the new data store node 130 does not store client data corresponding to the token range that was associated with the unavailable data store node 140. As a result, the number of copies of the client data corresponding to the token range that are stored within the various data stores 140 managed by the different data store nodes 130 within the distributed data store 105 is reduced by one. For example, if the unavailable data store node 130 was associated with the token range 101-200, then the number of copies of the client data corresponding to the token range 101-200 that are stored within the various data stores 140 managed by the different data store nodes 130 within the distributed data store 105 is reduced by one.

Warming Up a Replacement Data Store Mode

To restore the level of redundancy provided by the distributed data store 105 after an unavailable data store node 130 is replaced with a new data store node 130, the node manager 160 included in the new data store node 130 performs warm up operations. As referred to herein, "warming up" is the process of storing client data in the data store 140 managed by a given data store node 130 prior to configuring the data store node 130 to operate as part of the distributed data store 105. Warming up is also referred to herein as cold bootstrapping.

In general, the node manager 160 configures the data store node 130 to implement a hybrid replication scheme. After a data store node 130 within a particular rack 120 becomes unavailable, the cloud services subsystem 180 provides a new data store node 130 that is included in the rack 120. When the new data store node 130 becomes available, the node manager 160 begins to execute within the new data store node 130. Notably, neither the data store proxy engine 150 nor the data store 130 initially executes within the new data store node 130. The node manager 160 identifies the token range that the unavailable data store node 130 owned, and configures the new data store node 130 to own the identified token range.

As person skilled in the art will recognize, multiple data store nodes 130 own each token range. Notably, the node manager 160 identifies a "source" node that also owns the identified token range. More precisely, the node manager 160 sets a source node equal to one of the data store nodes 130 that are included in the same data center 115 as the new data store node 130, but in a different rack 120.

Subsequently, the node manager 160 causes the "new" data store 140 managed by the new data store node 130 to begin executing. The node manager 160 configures the new data store 130 as a slave of the "source" data store 140 managed by the source node. The node manager 160 then configures the source data store 140 to stream the client data stored in the source data store 140 to the new data store 140.

After the node manager 160 determines that the new data store 140 has received and stored all of the client data stored in the source data store 140, the node manager 160 configures the new data store 130 as a master instead of a slave. Finally, the node manager 130 configures the "new" data store proxy engine 150 to begin executing within the new data store node 130. When the new data store proxy engine 150 begins executing, the data store node 130 can receive and process write requests from the clients as a master node in the distributed data store 105. Notably, the new data store node 130 is an owner of the client data that was previously owned by the unavailable data store node 130.

Note that the techniques described herein are illustrative rather than restrictive, and may be altered without departing from the broader spirit and scope of the invention. In particular, the functionality provided by the node manager 130, the data store proxy engine 150, the data store 140, the token data store 170, and the cloud services subsystem 180 may be implemented in any number of software applications in any combination. Further, in various embodiments, any number of the techniques disclosed herein may be implemented while other techniques may be omitted in any technically feasible fashion.

Many modifications and variations on the functionality provided by the node manager 130, the data store proxy engine 150, the data store 140, the token data store 170, and the cloud services subsystem 180 will be apparent to those of ordinary skill in the art without departing from the scope and spirit of the described embodiments. Alternate embodiments include any distributed data base that implements master-slave replication techniques during warm up of replacement data store nodes and master-master replication techniques after warm up.

Figure 2:
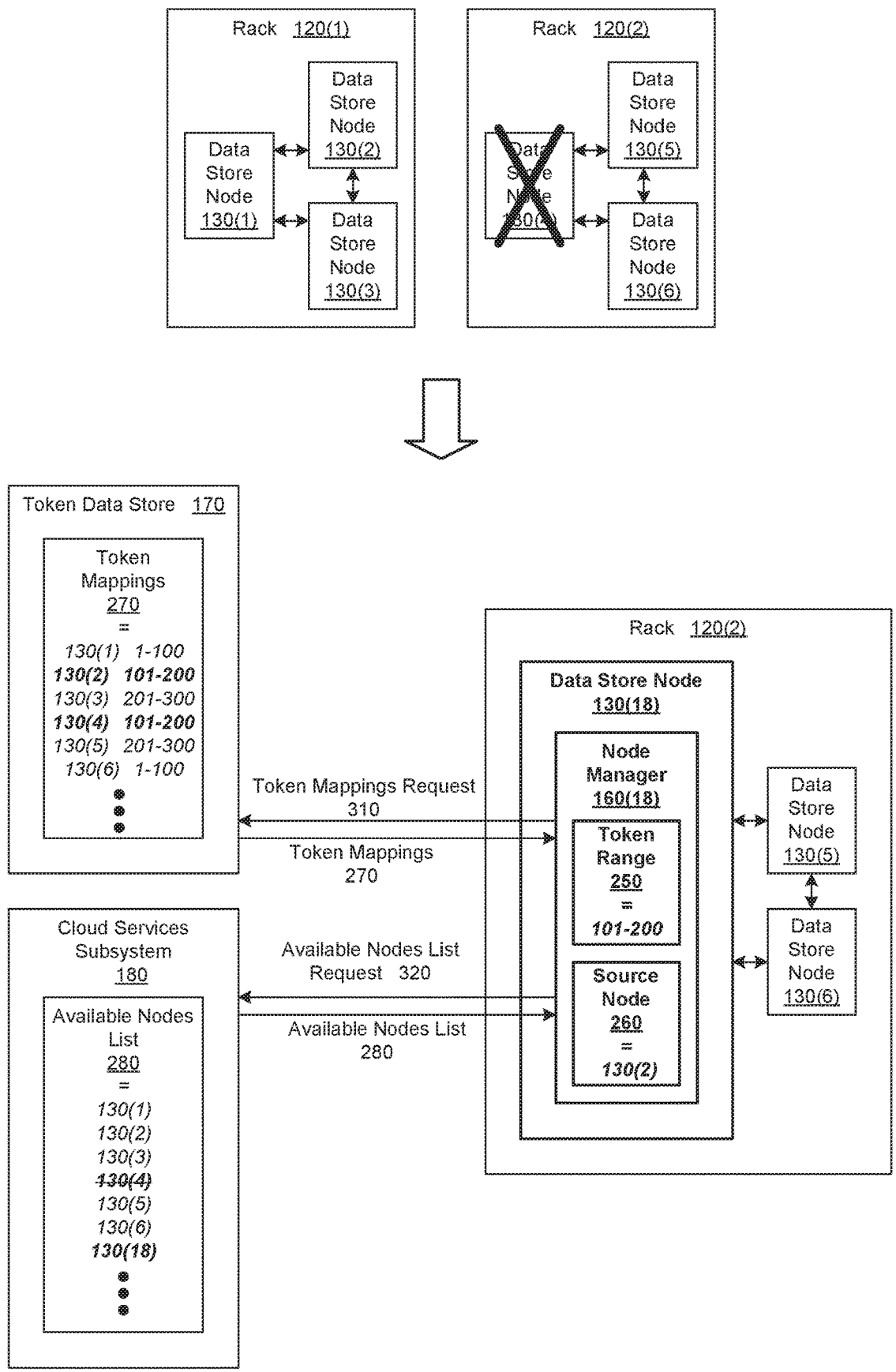
FIG. 2 illustrates how the node manager of FIG. 1 identifies a source node for warming up a data store node, according to various embodiments of the present invention.

FIG. 2 illustrates how the node manager 160(18) of FIG. 1 identifies a source node 260 for warming up the data store node 130(18), according to various embodiments of the present invention. For explanatory purposes only, FIG. 2 depicts the data center 115(1) that includes, without limitation, two racks 120(1) and 120(2). The rack 120(1) includes, without limitation, the data store nodes 130(1), 130(2), and 130(3), The rack 120(2) includes, without limitation, the data store node 130(4), 130(5), and 130(6). The data store node 130(4) becomes unavailable and the cloud services subsystem 180 provides the new data store node 130(18) to replace the data store node 130(4) in the rack 120(2).

When the data store node 130(18) becomes available, the node manager 160(18) begins to execute within the new data store node 130(18). As shown, the node manager 160(18) interacts with both the token data store 170 and the cloud services subsystem 180 to identify a token range 250 and the source node 260. The token data store 170 includes, without limitation, token mappings 270 that specify the token range owned by each of the data store nodes 130 included in the distributed data store 105. The token data store 170 may store any amount and type of information associated with the token and the data store nodes 130 in any technically feasible fashion. For instance, in some embodiments, for each of the data store nodes 130, the token data store 170 stores information that identifies the associated rack 120 and the associated data center 115.

The cloud services subsystem 180 includes, without limitation, an available nodes list 280. The available nodes list 280 identifies the data store nodes 130 that are both available and assigned to the distributed data store 105. The cloud services subsystem 180 may provide any amount and type of information associated with the data store nodes 130 in any technically feasible fashion. For instance, in some embodiments, for each of the data store nodes 130, the cloud services subsystem 180 identifies the associated rack 120 and the associated data center 115.

In operation, the node manager 160(18) transmits a token mappings request 310 to the token data store 170 and, in response, receive the token mappings 270. In alternate embodiments, the node manager 140 may configure the token mappings request 310 to request the token mappings 270 that match any criteria in any technically feasible fashion. For example, the node manager 160(18) could configure the token mappings request 310 to request token mappings 270 for the subset of data store nodes 130 that are included in the data center 115(1).

For explanatory purposes only, the token mappings 270 specify three different token ranges: 1-100, 101-200, and 201-300. The data store node 130(1) in the rack 120(1) and the data center 115(1) and the data store node 130(6) in the rack 120(2) and the data center 115(1) own the token range 1-100. The data store node 130(2) in the rack 120(1) and the data center 115(1) and the data store node 130(4) in the rack 120(2) and the data center 115(1) own the token range 101-201. The data store node 130(3) in the rack 120(1) and the data center 115(1) and the data store node 130(5) in the rack 120(2) and the data center 115(1) own the token range 201-301.

The node manager 160(18) transmits an "available nodes list request" 320 to the cloud services subsystem 180 and, in response, receive the available nodes list 280. Because the data store node 130(4) has become unavailable, the data store node 130(4) is not included in the available nodes list 280. By contrast, because the data store node 130(18) has become available, the data store node 130(18) is included in the available nodes list 280.

In alternate embodiments, the node manager 160(18) may configure the available nodes list request 320 to request the available nodes list 280 that includes the data store nodes 130 that match any criteria in any technically feasible fashion. Further, the node manager 160(18) may request any amount and type of information associated with the data store nodes 130 in any technically feasible fashion that enables the node manager 160(18) to determine the available nodes list 280. The node manager 160(18) may transmit the token mapping request 310 and the available nodes list request 320 in any sequential order or substantially in parallel and based on any communications protocol(s).

After receiving the token mappings 270 and the available nodes list 280, the node manager 160(18) performs comparison operations to identify the unavailable data store node 130 and the token range 250 that was previously owned by the unavailable data store node 130. More precisely, the node manager 160(18) compares the available nodes list 280 to the token mappings 270 and determines that the token mappings 270 include the token range 101-200 for the data store node 130(4), but the data store 130(4) is not included in the available nodes lists 280. Consequently, the node manager 160(18) determines that the data store node 130(4) has become unavailable and owned the client data associated with the token range 101-200.

To ensure that the client data associated with the token range 101-200 continues to be owned by the previous number of owners, the node manager 160(18) configures the data store node 130(18) to own the token range 250 "101-200." The node manager 160(18) may configure the data store node 130(18) to own the token range 250 in any technically feasible fashion. For example, the node manager 160(18) may configure the token data store 170 to update the token mappings 270 to map the data store node 130(18) to the token range 250 "101-200."

The node manager 160(18) then performs comparison operations to identify the "matching" data store nodes 130 that are included in the available nodes list 280 and own the client data associated with the token range 250 "101-200." As persons skilled in the art will recognize, each token range is owned by any number of the data store nodes 130 in any number of the racks 120 in any number of the data centers 115. The node manager 160(18) may set the source node 260 to any one of the matching data store nodes 130. As shown, the node manager 160(18) sets the source node 260 to the data store node 130(2) that is included in the rack 220(1) included in the data center 215(1), In general, the node manager 160(18) may select one of the matching data store nodes 130 as the source node 260 in any technically feasible fashion. For example, in some embodiments, the node manager 160(18) may select the data store node 130 that has been alive for the longest period of time and is included in the same data center 115 as the data store node 130(18). In alternate embodiments, the node manager 160(18) may interact with any number (including zero) of components included in the system 100 in any technically feasible fashion to determine the source node 260.

Implementing a Hybrid Replication Scheme

Figure 3:
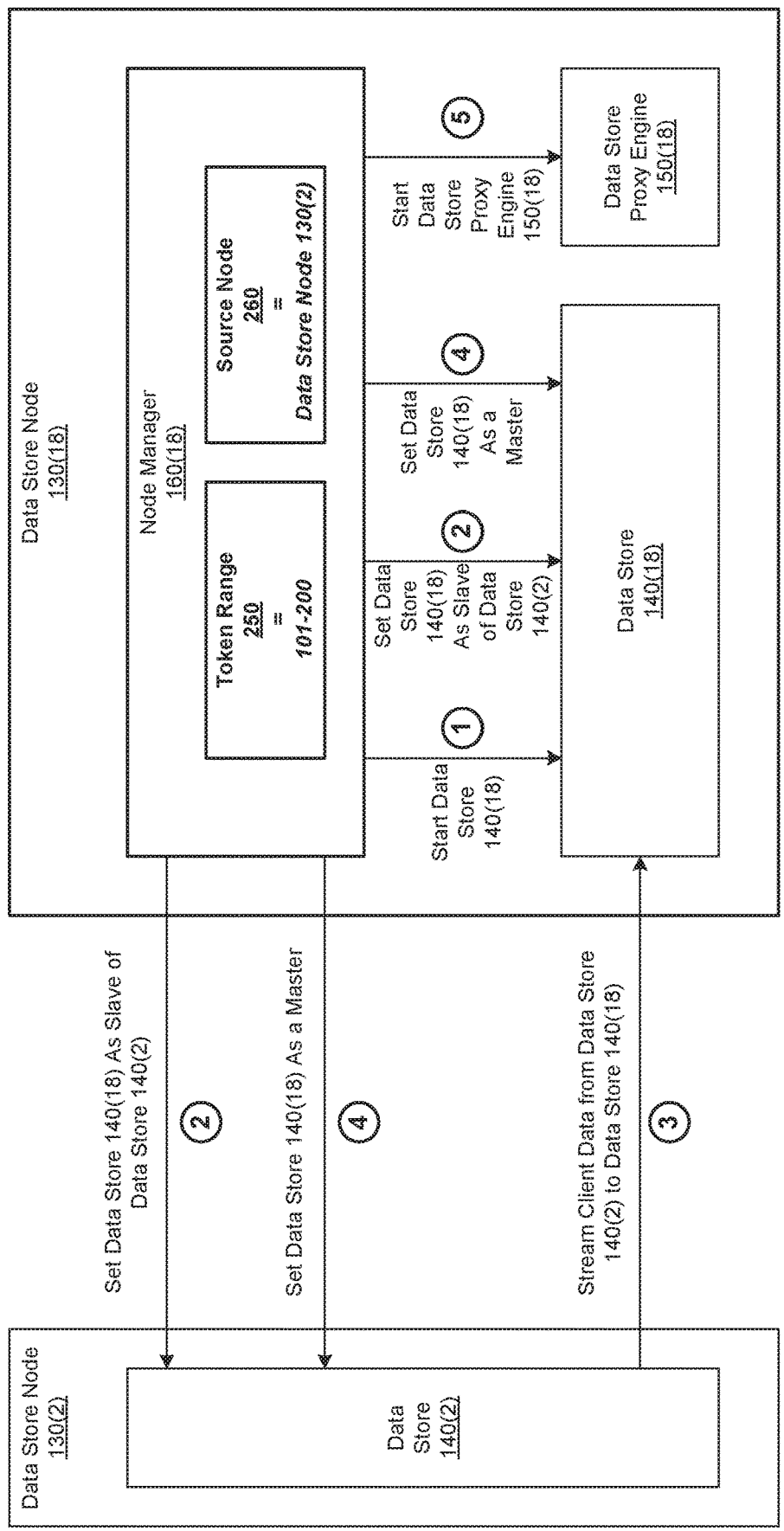
FIG. 3 illustrates how the node manager of FIG. 2 warms up the data store node, according to various embodiments of the present invention.

FIG. 3 illustrates how the node manager 160(18) of FIG. 2 warms up the data store node 130(18), according to various embodiments of the present invention. For explanatory purposes only, FIG. 3 depicts a sequence of events involved in a warm up process as a sequence of operations with circles that are labeled 1, 2, 3, 4, and 5. As shown, after the node manager 160(18) begins executing, the node manager 130(18) identifies the source node 260 for the warm up process as the data store node 130(2). Note that neither the data store 140(18) nor the data store proxy engine 150(18) initially executes.

After identifying the source node 260 and as depicted with the circle labeled 1, the node manager 120(18) causes the data store 140(18) to begin executing. As depicted with the two circles labeled 2, the node manager 160(18) then configures the data store node 140(18) as a slave of the data store node 140(2) that is managed by the source node 260. More specifically, the node manager 160(18) generates a command that specifies that the data store 140(18) is a slave of the data store 140(2). The node manager 160(18) transmits the command to both the data store 140(18) and the data store 140(2). In general, configuring the data store 140(x) as a slave is also referred to herein as configuring the data store node 130(x) that manages the data store 104(x) as a slave node. In alternate embodiments, the node manager 160(x) may configure the data store 140(x) as a slave of another data store 140(y) in any technically feasible fashion that is consistent with the protocols implemented in the data stores 140.

Subsequently, as depicted with the circle labeled 3, the node manager 160(18) configures the data store 140(2) to stream the client data stored in the data store 140(2) to the data store 140(18). The node manager 160(18) may configure the data store 140(2) to stream the client data stored in the data store 140(2) to the data store 140(18) in any technically feasible fashion using any communication protocols as known in the art. After the data store 140(2) finishes the streaming operations, the node manager 160 determines whether the data store 140(18) has received and stored all of the client data stored in the source data store 140(2).

In general, the node manager 160(18) may determine whether the data store 140(18) has received and stored all of the client data stored in the data store 140(2) in any technically feasible fashion. For example, the node manager 160(18) could compare the total size of the client data stored in the data store 140(18) to the total size of the client data stored in the data store 140(2). If the node manager 160(18) determines that size of the client data stored in the data source 140(18) is not equal to the size of the client data stored in the data store 140(2), then the node manager 160(18) may implement any type of error handling. For example, in some embodiments, the node manager 160(18) may configure the data store 140(2) to re-stream the client data. After a predetermined number of unsuccessful attempts, the node manager 160(18) may generate an error message before continuing to warm up the data store node 130(18) with partial client data.

The node manager 160(18) then configures the data store 140(18) as a master instead of a slave. More precisely, as depicted with the two circles labeled 4, the node manager 160(18) generates a command that specifies that the data store 140(18) is a slave of "no one." The node manager 160(18) then transmits the command to both the data store 140(18) and the data store 140(2). In general, configuring the data store 140(x) as a master node is also referred to herein as configuring the data store node 130(x) that manages the data store 140(x) as a master node. In alternate embodiments, the node manager 160(x) may configure the data store 140(x) as a master node in any technically feasible fashion that is consistent with the protocols implemented in the data stores 140. Finally, as depicted with the circle labeled 5, the node manager 160(18) causes the data store proxy engine 150(18) to begin executing. When the data store proxy engine 150(18) begins executing, the data store node 130(18) is configured to receive and process write requests from the client nodes 110 as a master node in the distributed data store 105 that owns the token range 250.

Many modifications and variations on the functionality provided by the node manager 130, the data store proxy engine 150, the data store 140, the token data store 170, and the cloud services subsystem 180 will be apparent to those of ordinary skill in the art without departing from the scope and spirit of the described embodiments. For instance, in alternate embodiments, the data store proxy engine 150(18) may begin to execute when the new data store node 130(18) becomes available. In such embodiments, prior to setting the data store 140(18) as a slave of the data store 140(2), the node manager 160(18) may configure the data proxy engine 150(18) to operate in a buffering or standby mode. The buffering or standby mode ensures that other data store nodes 130 within the distributed data store 105 process client requests instead of the data store node 130(18) while the node manager 160(18) warms up the data store 140(18).

After the data store 140(18) has received all of the client data, the node manager 160(18) may configure the data proxy engine 150(18) to operate in a write-only mode instead of the standby mode. Operating in a write-only mode ensures that the client data stored in the data store node 130(18) is updated while the node manager 160(18) finishes the warm up process. Finally, after the node manager 160(18) configures the data store 140(18) as a master instead of a slave, the node manager 160(18) configures the data proxy engine 150(18) to operate in a normal mode. The normal mode configures the data proxy engine 150(18) to receive and process requests from the client nodes 110.

Figure 4:
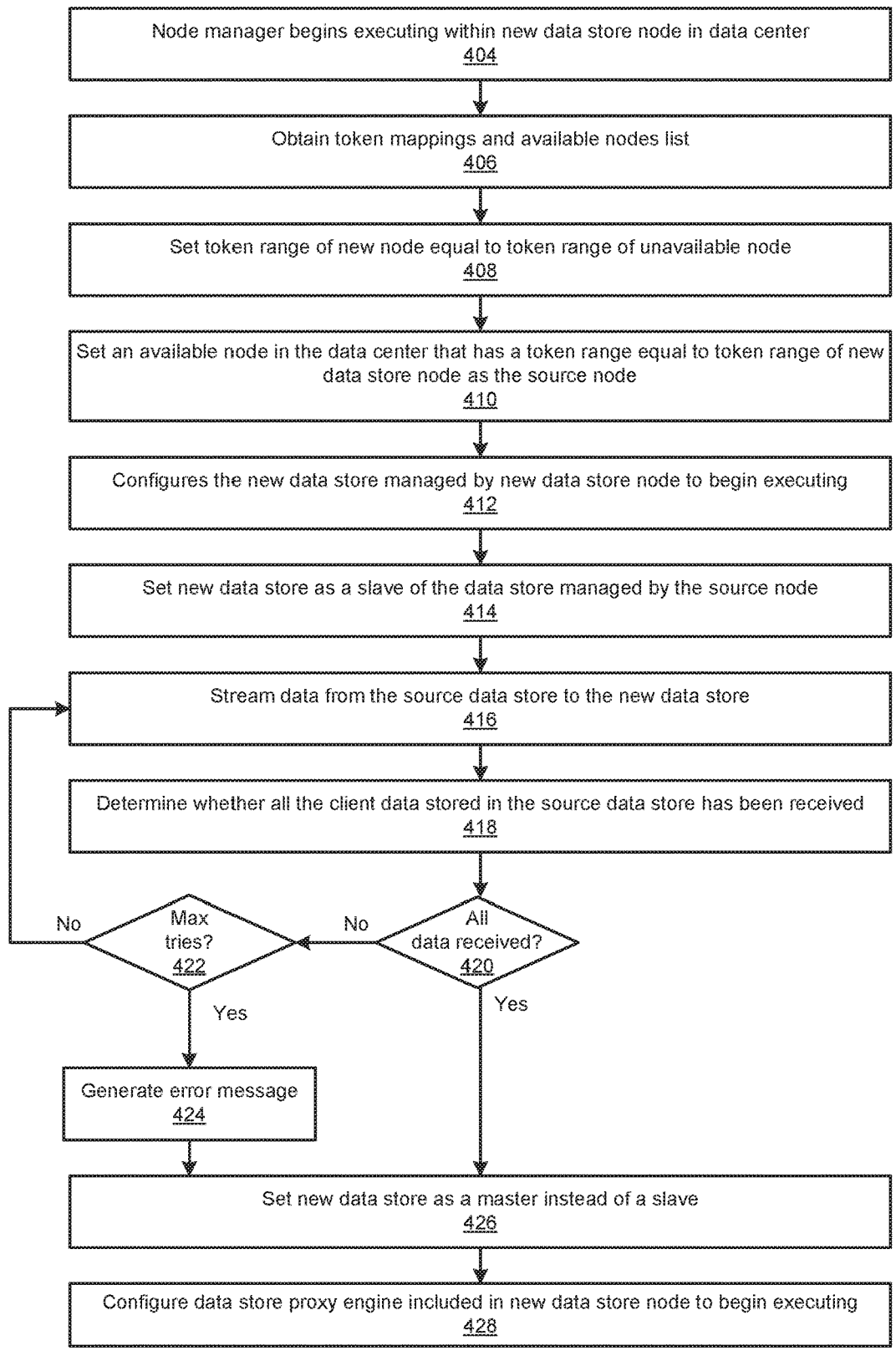
FIG. 4 is a flow diagram of method steps for restoring a distributed data store after a data store node becomes unavailable, according to various embodiments of the present invention.

FIG. 4 is a flow diagram of method steps for restoring a distributed data store after a data store node becomes unavailable, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the node manager 160 (new) begins executing within a new data store node 130 (new). The data store node 130 (new) is provided by the cloud services subsystem 180 as a replacement for the data store node 180 (unavailable) that was previously included in the data center 105 of the distributed data store 105, but has become unavailable. At step 406, the node manager 160 (new) obtains the token mappings 270 and the available nodes list 280. More specifically, the node manager 160 (new) transmits the token mappings request 310 to the token data store 170 and, in response, receives the token mappings 270. Further, the node manager 160 (new) transmits the available nodes list request 320 to the cloud services subsystem 180 and, in response, receives the available nodes list 280.

At step 408, the node manager 160 (new) performs one or more comparison operations between the token mappings 170 and the available nodes list 280 to determine the token range 250 that was previously owned by the data store node 180 (unavailable), The node manager 160 (new) then configures the data store node 130 (new) as an owner of the token range 250. At step 410, the node manager 160 (new) sets the source node 260 equal to a data store node 130 that is included in the available nodes list 280 and owns the token range 250. The node manager 160 (new) may select between multiple data store nodes 130 that are included in the available nodes list 280 and own the token range 250 in any technically feasible fashion.

At step 412, the node manager 160 (new) configures the data store 240 (new) that is managed by the data store node 130 (new) to begin executing. At step 414, the node manager 160 (new) configures the data store 140 (new) as a slave of the data store 140(source) that is managed by the source node 260. At step 416, the node manager 160 (new) configures the data store 140(source) to stream the client data stored in the data store 140(source) to the data store 140 (new) for storage. At step 418, the node manager 160 (new) determines whether all the client data that is stored in the data store 140(source) has been received and stored by the data store 140 (new).

If, at step 420, the node manager 160 (new) determines that all the client data that is stored in the data store 140(source) has not been received and stored by the data store 140 (new), then the method 400 proceeds to step 422. At step 422, the node manager 160 (new) determines whether the node manager 160 (new) has exceeded a predetermined number of streaming attempts. If, at step 422, the node manager 160 (new) determines that the node manager 160 (new) has not exceeded the predetermined number of streaming attempts, then the method 400 returns to step 416, when the node manager 160 (new) again configures the data store 140(source) to stream the client data to the data store 140 (new).

If, however, at step 422, the node manager 160 (new) determines that the node manager 160 (new) has exceeded the predetermined number of streaming attempts, then the method 400 proceeds to step 424. At step 424, the node manager 160 (new) generates an error message, and the method 400 proceeds to step 426. If, however, at step 420, the node manager 160 (new) determines that all the client data that is stored in the data store 140(source) has been received by the data store 140 (new), then the method 400 proceeds directly to step 426.

At step 426, the node manager 160 (new) sets the data store 140 (new) as a master (i.e., a slave of no one). At step 428, the node manager 160 (new) configures the data store proxy engine 150 (new) included in the data store node 130 (new) to begin executing. After the data store proxy engine 150 (new) begins executing, the data store node 130 (new) operates as a master node in the distributed data store 105. Notably, the data store proxy engine 150 (new) includes a copy of the client data that was previously stored in the data store 140 (unavailable).

In sum, the disclosed techniques may be used to automatically warm up a new data store node that replaces an unavailable data store node in a distributed data store. Each data store node manages an associated non-distributed data store via a data store proxy engine and a node manager. The data store proxy engine implements replication techniques that configure the non-distributed data store to store data as part of the distributed data store. The node manager performs management operations associated with the distributed data store and integrates the distributed data store with a cloud services subsystem.

When a data store node becomes unavailable, the cloud services subsystem replaces the unavailable data store node with a new data store node. When the new data store node becomes available, the node manager executes within the new data store node. The node manager transmits a query to a token data store to obtain token mappings between data store nodes and token ranges associated with client data. The node manager also transmits a query to the cloud services subsystem to obtain an available nodes list for the distributed data store. The node manager combines the token mappings and the available nodes list to identify a source node that stores client data for the token range associated with the unavailable data store node within the source data store 140 managed by the source node.

The node manager starts the "new" data store managed by the new data store node and sets the new data store as a slave of the "source" data store managed by the source node. The node manager then configures the source data store to stream client data to the new data store. After the new data store receives and stores all the client data that is stored in the source data store, the node manager sets the new data store as a slave of no node (i.e., a master). Finally, the node manager starts the data store proxy engine included in the new data store node. The data store proxy engine implements master-master replication scheme techniques that configure the new data store node to operate as a master node in the distributed data store.

Advantageously, the node manager automatically restores the functionality of the distributed data store after a data store node becomes unavailable. More specifically, by implementing a hybrid replication scheme during the "warm up" of a new data store node, the node manager enables the distributed data store to continue providing services to clients while restoring the previous level of client data redundancy. By contrast, replacing a master node in a conventional master-slave replication scheme results in an interruption in services. Further, replacing any unavailable data store node in a conventional master-master replication scheme reduces the number of complete copies of the client data that are stored within the various data stores managed by the different data store nodes included in the distributed data store.

1. In some embodiments, a method comprises determining that a first node included in a distributed data store has become unavailable; identifying a source node included in the distributed data store that operates as a first master node, wherein the source node stores client data that was previously stored by the first node; configuring a new node included in the distributed data store to operate as a slave node of the source node; streaming client data from a first data store managed by the source node to a second data store managed by the new node; and after the client data has been streamed, configuring the new node to operate as a second master node.

2. The method of clause 1, wherein identifying the source node comprises performing one or more comparison operations between a list of available nodes and a plurality of token mappings to determine a token range that is associated with the first node; and performing one or more comparison operations between the token range and the list of token mappings to determine an available node that is associated with the token range.

3. The method of clauses 1 or 2, further comprising transmitting a request for the plurality of token mappings to a third data store that stores the plurality of token mappings, and, in response, receiving the plurality of token mappings.

4. The method of any of clauses 1-3, further comprising transmitting a request for the list of available nodes to a cloud services subsystem, and, in response, receiving the list of available nodes.

5. The method of any of clauses 1-4, wherein configuring the new node to operate as the slave node of the source node comprises generating a command that designates the second data store as a slave of the first data store; and transmitting the command to at least one of the first data store and the second data store.

6. The method of any of clauses 1-5, wherein configuring the new node to operate as the second master node comprises generating a command that designates the second data store as a master; transmitting the command to at least one of the first data store and the second data store; and configuring a proxy engine to manage the second data store based on a master-master replication scheme.

7. The method of any of clauses 1-6, wherein streaming the client data comprises executing one or more streaming operations to transmit the client data from the first data store to the second data store; and determining that a first amount of the client data stored in the second data store does not match a second amount of the client data stored in the first data store, and, in response, re-executing the one or more streaming operations.

8. The method of any of clauses 1-7, further comprising receiving a write request to store new client data; determining that the new client data is associated with both the second data store and the first data store; performing one or more write operations to store the new client data in the second data store; and transmitting the new client data to the source node, wherein the source node stores the new client data in the first data store.

9. In some embodiments, a computer-implemented computer-readable storage medium includes instructions that, when executed by a processor, cause the processor to perform the steps of determining that a first node included in a distributed data store has become unavailable, wherein the first node previously stored client data; configuring a new node included in the distributed data store to operate as a slave node of a source node included in the distributed data store, wherein the source node operates as a first master node; while the new node is operating as the slave node, configuring the new node to store the client data; and after the new node has stored the client data, configuring the new node to operate as a second master node.

10. The computer-readable storage medium of clause 9, further comprising selecting the source node based on a token range that is associated with the first node.

11. The computer-readable storage medium of clauses 9 or 10, wherein selecting the source node comprises performing one or more comparison operations between a list of available nodes and a plurality of token mappings to determine the token range; and performing one or more comparison operations between the token range and the list of token mappings to determine an available node that is associated with the token range.

12. The computer-readable storage medium of any of clauses 9-11, further comprising configuring the new node to share ownership of the client data with at least the source node.

13. The computer-readable storage medium of any of clauses 9-12, wherein configuring the new node to operate as the slave node of the source node comprises generating a command that designates a first data store managed by the new node as a slave of a second data store managed by the source node; and transmitting the command to at least one of the first data store and the second data store.

14. The computer-readable storage medium of any of clauses 9-13, wherein configuring the new node to operate as the second master node comprises generating a command that designates the first data store as a master; transmitting the command to at least one of the first data store and the second data store; and configuring a proxy engine to manage the first data store based on a master-master replication scheme.

15. The computer-readable storage medium of any of clauses 9-14, wherein configuring the new node to store the client data comprises streaming the client data from the second data store to the first data store.

16. The computer-readable storage medium of any of clauses 9-15, wherein the distributed data store includes a plurality of data centers, a first data center included in the plurality of data centers includes a plurality of racks, the first node and the new node are included in a first rack included in the plurality of racks, and the source node is included in a second rack included in the plurality of racks.

17. In some embodiments, a system comprises a memory storing instructions associated with a warm up engine; and a processor that is coupled to the memory and, when executing the instructions, is configured to determine that a first node included in a distributed data store has become unavailable; configure a new node included in the distributed data store to operate as a slave node of a source node included in the distributed data store, wherein the source node operates as a first master node; while the new node is operating as the slave node, cause the source node to perform one or more operations that warm up the new node; and after the new node is warmed up, configure the new node to operate as a second master node.

18. The system of clause 17, wherein the one or more operations comprise streaming the client data from a first data store managed by the source node to a second data store managed by the new node.

19. The system of clauses 17 or 18, wherein the processor is further configured to receive a write request to store new client data; determine that the new client data is associated with both the second data store and the first data store; perform one or more write operations to store the new client data in the second data store; and transmit the new client data to the source node, wherein the source node stores the new client data in the first data store.

20. The system of any of clauses 17-19, wherein the first data store comprises an in-memory data store or a storage engine that is optimized for a solid-state drive.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    identifying a source node included in the distributed data store by comparing a token range associated with the first node and a plurality of token mappings to determine that the source node is associated with the token range, wherein the source node operates as a first master node and stores client data that was previously stored by the first node;
    configuring a new node included in the distributed data store as a slave of the source node until the client data is available to the new node;
    streaming client data from a first data store managed by the source node to a second data store managed by the new node; and
    after the client data has been streamed, configuring the new node to operate as a second master node.

2. The computer-implemented method of claim 1, wherein identifying the source node comprises:
    performing one or more comparison operations between a list of available nodes and a plurality of token mappings to determine a token range that is associated with the first node; and
    performing one or more comparison operations between the token range and the list of token mappings to determine an available node that is associated with the token range.

3. The computer-implemented method of claim 2, further comprising transmitting a request for the plurality of token mappings to a third data store that stores the plurality of token mappings, and, in response, receiving the plurality of token mappings.

4. The computer-implemented method of claim 2, further comprising transmitting a request for the list of available nodes to a cloud services subsystem, and, in response, receiving the list of available nodes.

5. The computer-implemented method of claim 1, wherein configuring the new node to operate as the slave node of the source node comprises:
    generating a command that designates the second data store as a slave of the first data store; and
    transmitting the command to at least one of the first data store and the second data store.

6. The computer-implemented method of claim 1, wherein configuring the new node to operate as the second master node comprises:
    generating a command that designates the second data store as a master;
    transmitting the command to at least one of the first data store and the second data store; and
    configuring a proxy engine to manage the second data store based on a master-master replication scheme.

7. The computer-implemented method of claim 1, wherein streaming the client data comprises:
    executing one or more streaming operations to transmit the client data from the first data store to the second data store; and
    determining that a first amount of the client data stored in the second data store does not match a second amount of the client data stored in the first data store, and, in response, re-executing the one or more streaming operations.

8. The computer-implemented method of claim 1, further comprising:
    receiving a write request to store new client data;
    determining that the new client data is associated with both the second data store and the first data store;
    performing one or more write operations to store the new client data in the second data store; and
    transmitting the new client data to the source node, wherein the source node stores the new client data in the first data store.

9. One or more non-transitory computer-readable storage media including instructions that, when executed by one or more processors, cause the one or more processors to perform the steps of:

determining that a first node included in a distributed data store has become unavailable, wherein the first node previously stored client data;

configuring a new node included in the distributed data store as a slave of a source node that operates as a first master node and stores client data that was previously stored by the first node, wherein configuring the new node comprises:

generating a command that designates a first data store managed by the new node as a slave of a second data store managed by the source node, and transmitting the command to at least one of the first data store or the second data store;

while the new node is operating as the slave node, configuring the first data store managed by the new node to store the client data; and after the new node has stored the client data, configuring the new node to operate as a second master node.

10. The one or more non-transitory computer-readable storage media of claim 9, further comprising selecting the source node based on a token range that is associated with the first node.

11. The one or more non-transitory computer-readable storage media of claim 10, wherein selecting the source node comprises:

performing one or more comparison operations between a list of available nodes and a plurality of token mappings to determine the token range; and performing one or more comparison operations between the token range and the list of token mappings to determine an available node that is associated with the token range.

12. The one or more non-transitory computer-readable storage media of claim 9, further comprising configuring the new node to share ownership of the client data with at least the source node.

13. The one or more non-transitory computer-readable storage media of claim 9, wherein configuring the new node to operate as the second master node comprises:

generating a command that designates the first data store as a master;

transmitting the command to at least one of the first data store and the second data store; and configuring a proxy engine to manage the first data store based on a master-master replication scheme.

14. The one or more non-transitory computer-readable storage media of claim 9, wherein configuring the new node to store the client data comprises streaming the client data from the second data store to the first data store.

15. The one or more non-transitory computer-readable storage media of claim 9, wherein the distributed data store includes a plurality of data centers, a first data center included in the plurality of data centers includes a plurality of racks, the first node and the new node are included in a first rack included in the plurality of racks, and the source node is included in a second rack included in the plurality of racks.

16. A system, comprising:

a memory storing instructions associated with a warm up engine; and a processor that is coupled to the memory and, when executing the instructions, is configured to:

determine that a first node included in a distributed data store has become unavailable;

configuring a new node included in the distributed data store as a slave of a source node that operates as a first master node and stores client data that was previously stored by the first node, wherein configuring the new node comprises:

generating a command that designates a first data store managed by the new node as a slave of a second data store managed by the source node, and transmitting the command to at least one of the first data store or the second data store;

while the new node is operating as the slave node, cause the source node to perform one or more operations that warm up the new node; and after the new node is warmed up, configure the new node to operate as a second master node.

17. The system of claim 16, wherein the one or more operations comprise streaming the client data from a first data store managed by the source node to a second data store managed by the new node.

18. The system of claim 17, wherein the processor is further configured to:

receive a write request to store new client data;

determine that the new client data is associated with both the second data store and the first data store;

perform one or more write operations to store the new client data in the second data store; and transmit the new client data to the source node, wherein the source node stores the new client data in the first data store.

19. The system of claim 17, wherein the first data store comprises an in-memory data store or a storage engine that is optimized for a solid-state drive.

* * * * *

UNITED STATES PATENT AND TRADEMARK OFFICE
CERTIFICATE OF CORRECTION

PATENT NO. : 10,749,921 B2
APPLICATION NO. : 15/379299
DATED : August 18, 2020
INVENTOR(S) : Ioannis Papapanagiotou et al.

It is certified that error appears in the above-identified patent and that said Letters Patent is hereby corrected as shown below:

In the Claims

Column 15, Claim 1, Lines 61, please insert --determining that a first node included in a distributed data store has become unavailable;--.

Signed and Sealed this
Twenty-seventh Day of October, 2020

Andrei Iancu
*Director of the United States Patent and Trademark Office*